April 21, 1959 — A. ROSS — 2,883,235
UTILITY TRAY
Filed Oct. 20, 1955 — 3 Sheets-Sheet 1
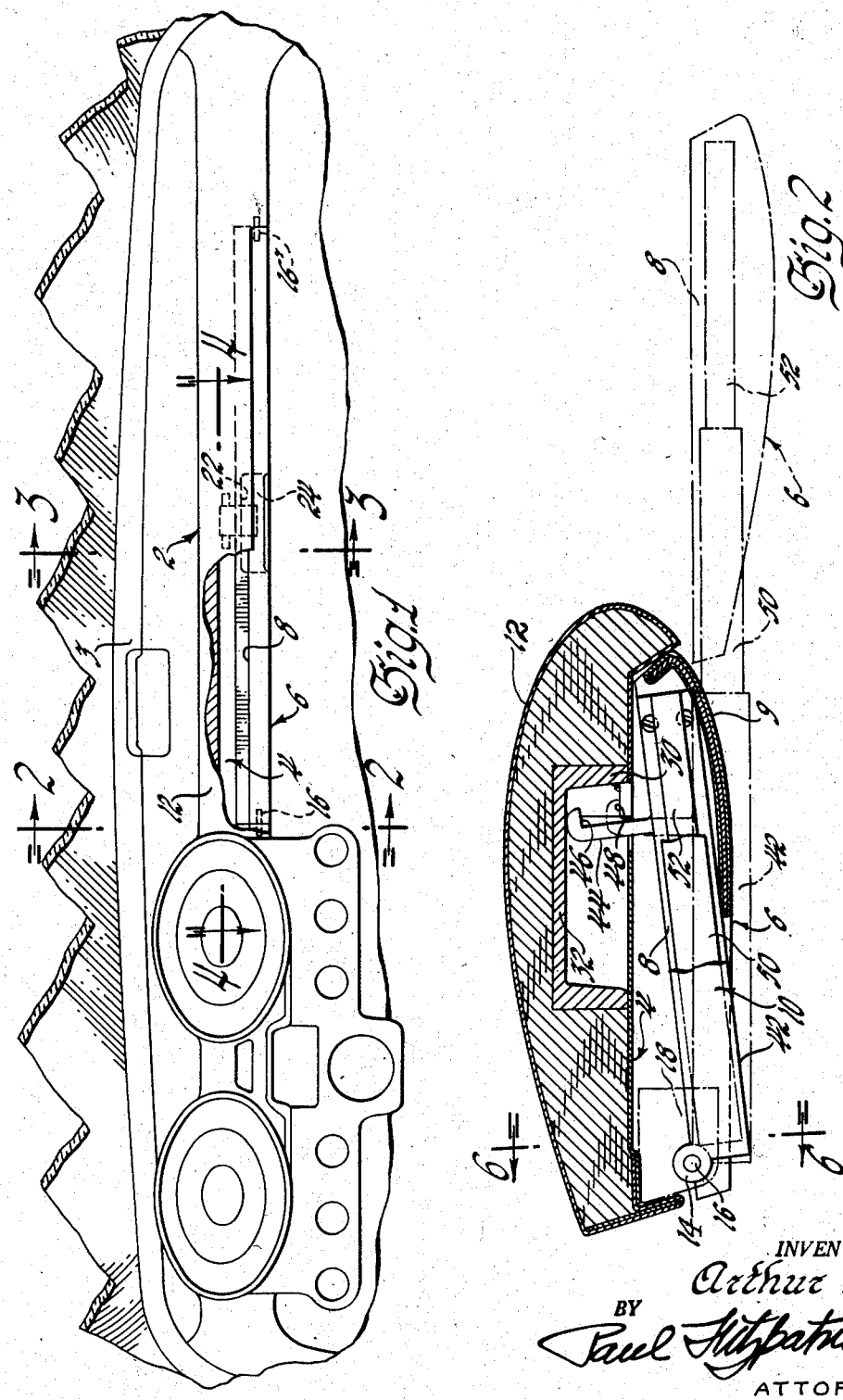
INVENTOR.
Arthur Ross
BY Paul Fitzpatrick
ATTORNEY April 21, 1959 A. ROSS 2,883,235
UTILITY TRAY
Filed Oct. 20, 1955 3 Sheets-Sheet 2
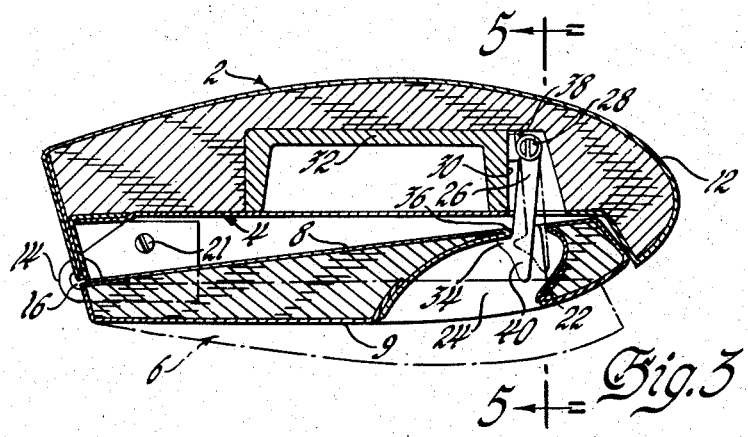
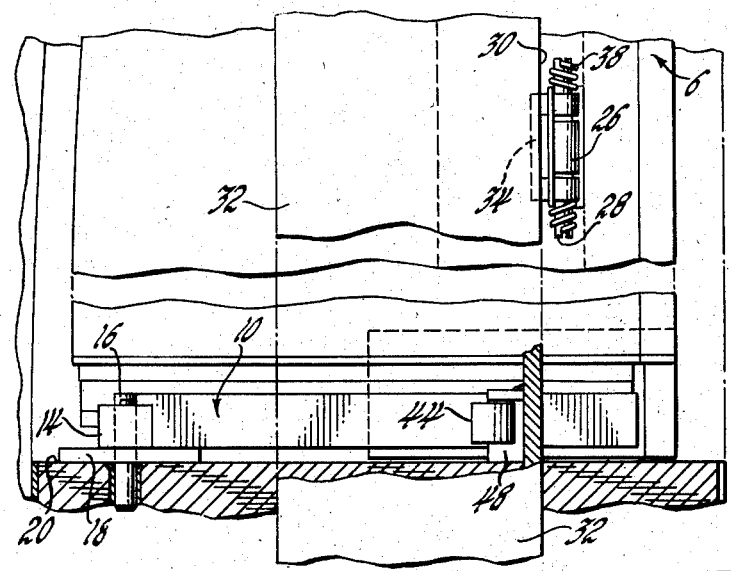
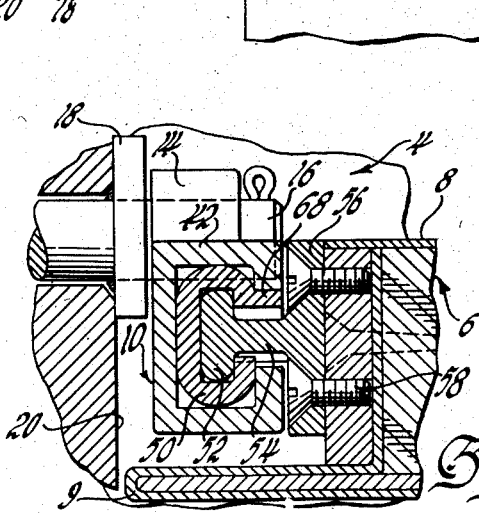
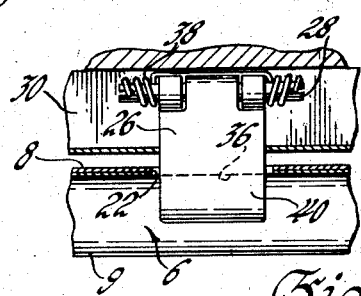
INVENTOR.
Arthur Ross
BY
Paul Fitzpatrick
ATTORNEY April 21, 1959
A. ROSS
2,883,235
UTILITY TRAY
Filed Oct. 20, 1955
3 Sheets-Sheet 3
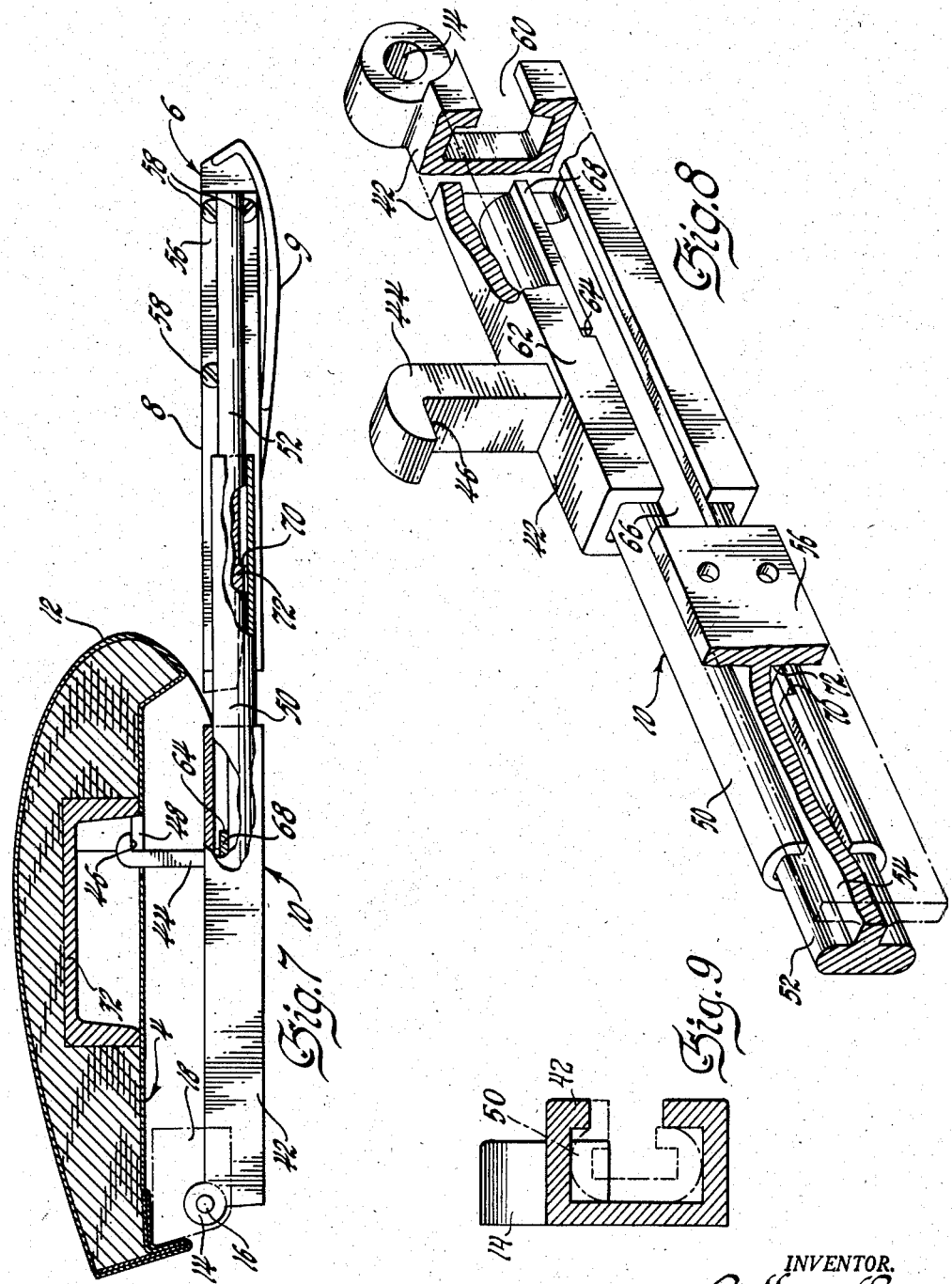
INVENTOR.
Arthur Ross
BY
ATTORNEY

United States Patent Office 2,883,235
Patented Apr. 21, 1959

2,883,235

UTILITY TRAY

Arthur Ross, Detroit, Mich., assignor to General Motors Corporation, Detroit, Mich., a corporation of Delaware Application October 20, 1955, Serial No. 541,717

6 Claims. (Cl. 296—37)

The present invention relates to utility tray construction and more particularly to a retractible tray structure adaped for installation in a vehicle instrument panel.

An object of the invention is to provide an improved vehicle instrument panel.

Another object is to provide a vehicle instrument panel having a retractible service tray associated therewith.

A further object is to provide a structure of the stated character in which the service or utility tray is normally streamlined into the configuration of the instrument panel.

A still further object is to provide a normally recessed utility or service tray which is extensible to provide a substantial horizontal supporting surface.

Yet a further object is to provide, in a device of the stated character, an improved guide rail structure permitting extension of the tray from a fully recessed position to an extended position exposing the entire tray.

Still another object is to provide a guide rail structure of the type referred to which is adapted for endwise assembly in one direction and which is self-limiting in said direction upon extension to predetermined limits.

Yet a further object is to provide a service tray guide structure capable of imparting optimum rigidity to the tray in an extended position.

These and other objects, advantages and features of the invention will become more fully apparent as reference is had to the accompanying specification and drawings wherein:

Fig. 1 is a fragmentary rear elevational view, partly in section, illustrating a vehicle instrument panel assembly incorporating the present invention.

Fig. 2 is a sectional side elevational view looking in the direction of arrows 2—2 of Fig. 1.

Fig. 3 is a sectional side elevational view looking in the direction of arrows 3—3 of Fig. 1.

Fig. 4 is an enlarged fragmentary plan view looking in the direction of arrows 4—4 of Fig. 1.

Fig. 5 is an enlarged fragmentary view looking in the direction of arrows 5—5 of Fig. 3.

Fig. 6 is an enlarged fragmentary sectional view looking in the direction of arrows 6—6 of Fig. 2.

Fig. 7 is a sectional side elevational view similar to Fig. 2 illustrating the relationship of the parts when the service tray is in an extended position;

Fig. 8 is an enlarged fragmentary perspective view illustrating the details of construction of the service tray guide assemblies; and Figure 9 is a fragmentary detail illustrating the relative relationship of parts shown in Figure 8.

Referring now to the drawings and particularly Fig. 1, there is illustrated a portion of the interior of a vehicle in which the reference numeral 2 designates generally the instrument panel housing. In the embodiment shown, panel 2 is constructed in the form of a transverse strut, which is spaced longitudinally from the windshield molding 3. Strut 2 is connected at its opposite ends to the opposite side walls of the vehicle. The left rearwardly facing portion of housing 2 is provided with a plurality of openings which accommodate the usual vehicle instrument cluster. Substantially transversely midway of the vehicle, the underside of instrument panel 2 is provided with an upwardly deformed portion 4 forming a generally rectangular recess which is occupied by a hinge mounted service or utility tray 6. Tray 6 is generally rectangular in the plan view and of sufficient area to provide a suitable supporting base 8 for maps, beverages or other materials for the convenience of the vehicle operator or passengers. As seen in Fig. 2, tray 6 is normally disposed in recess 4 and is formed with a contoured lower surface 9 which blends with the structural peripheral wall 12 of panel 2. When in use, tray 6 occupies the longitudinally rearwardly extended position shown in dotted lines.

In order to support tray 6 in relation to panel 2 in accordance with the invention, there are provided a pair of identical three-element guide rail assemblies 10, one at either side of tray 6. Each rail assembly 10 is pivotally connected at its rearward end by means of an integrally formed eye 14 which is pivotally supported on pin 16 of a mounting bracket 18. Bracket 18, in turn, is secured to side wall 20 of recess 4 by screw 21. Substantially laterally midway thereof, the upper surface 8 of tray 6 is formed with a laterally elongated aperture 22 which tapers into an enlarged upwardly directed finger access opening 24 formed in the lower wall 9 of the tray. Disposed in vertical alignment with opening 22 of a depending latch structure 26, the upper end of which is pivotally mounted on a hingle pin 28. Hinge pin 28, in turn, is secured to the forward wall 30 of a downwardly opening box-like member 32 disposed interiorly of instrument panel 2 above wall 4. At its lower end, latch structure 26 is formed with an integral forwardly directed portion providing a shoulder 34 which is adapted to engage the lip 36 of aperture 22 in tray 6. Latch 26 is normally biased in a clockwise direction (Fig. 3) by means of a coil spring 38 and is, therefore, effective to retain tray 6 in a normally closed position occupying recess 4.

When it is desired to extend tray 6 to the position shown in Fig. 7, the operator manually engages the lower end 40 of latch 26 through access opening 24 and displaces the latch in a counterclockwise direction about pivot 28 to disengage shoulder 34 from lip 36 of opening 22. Thereupon, tray 6 is gravity urged to swing downwardly about pin 16 to the position shown in dotted lines in Fig. 3. In order to limit downward swinging movement of tray 6, the outer rail element 42 of each rail assembly 10 is provided with an integral upwardly directed leg 44 having a rearwardly directed terminal portion forming a shoulder 46 which engages a forwardly directed ledge 48 secured to the wall 30 of box member 32. Legs 44 are dimensioned so as to align tray 6 in a substantially horizontal plane when the latter is released from the recessed position.

In order to permit withdrawal of tray 6 to an extended position exposing the entire area thereof in accordance with another feature of the invention, each guide rail assembly 10 includes an intermediate rail 50 which is adapted for telescoping movement in outer rail 42, and a third rail 52 which is, in turn, arranged in telescoping relation with rail 50. At one side thereof, rail 52 is formed with an integral inwardly directed horizontal rib 54 terminating in a vertically directed rectangular flange 56 which is rigidly secured to the side edge of tray 6 by means of machine screws 58. As seen best in Fig. 8, outer rail 42 is generally C-shaped in cross section and is formed with a full length longitudinally extending slot 60 in the inwardly facing wall 62 thereof. Near its rearward extremity, slot 60 is reduced in vertical width to provide an abutment shoulder 64. Intermediate rail 50, in turn, is generally C-shaped in cross section and is provided with a longitudinally extending slot 66 which faces in the same direction as slot 60 of outer rail 42. At its forward end, intermediate rail 50 is formed with a horizontal rib 68 which is adapted for endwise abutting engagement with abutment shoulder 64 of outer rail 42 when intermediate rail 50 is extended to a predetermined limit. At its rearward end, slot 66 of intermediate rail 50 is also reduced in vertical width to provide an abutment shoulder 70. Abutment shoulder 70 is effective to limit the forward telescoping movement of third rail 52 in intermediate rail 50, when engaged by the stop 72 depending from horizontal rib 54 of rail 52. It will now be seen that each element of rail assembly 10 may be progressively separated by merely sliding the individual rail elements forwardly in the direction of eye 14 on rail 42. Assembly of the three element structure is, of course, accomplished by successive endwise insertion of each element in telescoping relation. It will be noted, however, that when the rail assemblies are in assembled position, forward movement of intermediate rail 50 is limited by eye 14, which partially obstructs the terminal end of the channel formed by rail 42 (Fig. 9). As a result, each of rails 42, 50 and 52 lie in transverse alignment when tray 6 is in rearward position. Conversely, the rearward limit of movement of tray 6 is determined by abutment shoulders 64 and 70, respectively, of rails 42 and 50, respectively.

Because of the three-element telescoping construction of rail assemblies 10, the entire surface of tray 6 may be extended to a fully exposed position relative to trailing edge of panel 2. Due to the substantial overlapping relation of each of the elements 42, 50 and 52 in extended position, tray 6 is capable of supporting substantial weight and has no tendency to rock or rattle. In order to prevent any tendency of the tray to creep toward the closed position, each of the telescoping rails is peferably dimensioned to provide moderate frictional engagement with its adjacent guide rail.

While but one embodiment of the invention has been shown and described, it will be apparent that other changes and modifications may be made therein. It is to be understood that it is not intended to limit the invention to the embodiment shown, but only by the scope of the claims which follow.

I claim:

1. In a vehicle, a body member having a downwardly opening recess therein, a pair of extensible guide members within said recess pivotally supported at their rearward ends, a utility tray carried by said guide members, catch means associated with said body member normally preventing downward swinging of said guide members and said tray, abutment means provided by said body member normally preventing extension of said guide members, said catch means being releasable to allow for downward swinging of said guide members out of the path of said abutment means whereby said guide members may be extended, and coacting means carried by said guide members and said body member for supporting said guide members in extended position.

2. In a vehicle, a body member having a downwardly opening recess therein, a pair of extensible guide members within said recess pivotally supported at their rearward ends, each guide member comprising a plurality of telescopically related elements, a utility tray carried by said guide members, said tray being fixedly secured to the outermost of said elements, catch means associated with said body member normally preventing downward swinging of said guide members and said tray, an abutment provided by said body member normally preventing extension of said guide members, said catch means being releasable to allow for downward swinging of said guide members and said tray out of the path of said abutment means whereby said guide members may be extended, and coacting means carried by said guide members and said body member for supporting said guide members in extended position.

3. In a vehicle, an instrument panel housing having a downwardly opening recess therein, a pair of extensible guide members within said recess pivotally supported at their rearward ends, each said guide member comprising a plurality of telescopically related elements, a utility tray fixedly secured to the outermost of said elements, catch means associated with said panel housing normally preventing downward swinging of said guide members and said tray, abutment means provided by a wall of said recess normally preventing extension of said guide members and tray, said abutment means being adapted to engage said tray, said catch means being releasable to allow for downward swinging of said guide members and tray out of the path of said abutment means whereby said guide members may be extended, and coacting means carried by said guide members and said panel housing for supporting said guide members in extended position.

4. In a vehicle, an instrument panel housing having a downwardly opening recess therein, a pair of extensible guide members within said recess pivotally supported at their rearward ends, each said guide member comprising a plurality of telescopically related elements, a utility tray fixedly secured to the outermost of said elements, catch means associated with said panel housing normally preventing downward swinging of said guide members and said tray, abutment means provided by a wall of said recess normally preventing extension of said guide members and tray, said abutment means being adapted to engage said tray, said catch means being releasable to allow for downward swinging of said guide members and tray out of the path of said abutment means whereby said guide members may be extended, and coacting means carried by said guide members and said panel housing for suporting said guide members in extended position, said coacting means taking the form of a pair of hook-like extensions carried by the rearmost of said telescopically related elements, said extensions being adapted to engage a ledge in said panel housing.

5. An extensible utility tray construction according to claim 4 in which said catch means takes the form of a spring biased latch normally engaging a lip provided by said tray, said latch being trippable through an opening formed in said tray.

6. In a vehicle, an instrument panel housing having a downwardly opening recess therein, a second recess in said panel housing located above said first recess, a box-like structure within said second recess and opening to said first recess, a pair of extensible guide members within said first recess pivotally supported at their rearward ends near the innermost wall of such recess, each said guide member comprising a plurality of telescopically related elements, a utility tray fixedly secured to the outermost of said elements, a spring biased latch normally engaging a lip provided by said tray to prevent downward swinging of said guide members and said tray, said latch being trippable through an opening formed in said tray, abutment means provided by a wall of said recess normally preventing extension of said guide members and tray, said abutment means being adapted to engage said tray, and coacting means carried by said guide members and said box-like structure for supporting said guide members in extended position, said coacting means taking the form of a pair of hook-like extensions carried by the rearmost of said telescopically related elements, said extensions being adapted to engage a ledge provided by said box-like structure.

References Cited in the file of this patent

UNITED STATES PATENTS

| | | |
|---|---|---|
| 1,071,006 | Little | Aug. 19, 1913 |
| 1,210,362 | Raplee | Dec. 26, 1916 |
| 1,301,495 | Otte | Apr. 22, 1919 |
| 2,270,249 | Birkmeyer | Jan. 20, 1942 |
| 2,492,697 | Higley | Dec. 27, 1949 |
| 2,530,876 | Harris | Nov. 21, 1950 |